(12) United States Patent
Dumont et al.

(10) Patent No.: US 6,894,499 B2
(45) Date of Patent: May 17, 2005

(54) DEVICE FOR MEASURING AN ELECTRICAL PARAMETER THROUGH ELECTRICALLY-CONDUCTIVE CASING

(75) Inventors: Alain Dumont, Houston, TX (US); Nicolas Renoux, Le Plessis Robinson (FR); Philippe Salamitou, Mamaroneck, NY (US)

(73) Assignee: Schlumberger Technology Corporation, Sugar Land, TX (US)

( * ) Notice: Subject to any disclaimer, the term of this patent is extended or adjusted under 35 U.S.C. 154(b) by 143 days.

(21) Appl. No.: 10/363,838

(22) PCT Filed: Sep. 5, 2001

(86) PCT No.: PCT/EP01/10260

§ 371 (c)(1), (2), (4) Date: Jun. 16, 2003

(87) PCT Pub. No.: WO02/21162

PCT Pub. Date: Mar. 14, 2002

(65) Prior Publication Data

US 2004/0095142 A1 May 20, 2004

(30) Foreign Application Priority Data

Sep. 10, 2000 (FR) .......................................... 00011619

(51) Int. Cl.$^7$ ................................................. G01V 3/24
(52) U.S. Cl. ........................ 324/368; 324/355; 324/357
(58) Field of Search ................................. 324/368, 357, 324/370, 323, 342, 354, 355

(56) References Cited

U.S. PATENT DOCUMENTS

| 4,901,023 A | * | 2/1990 | Vail, III ...................... 324/339 |
| 5,642,051 A |   | 6/1997 | Babour et al. .............. 324/357 |
| 6,064,210 A | * | 5/2000 | Sinclair ...................... 324/369 |
| 6,633,164 B2 | * | 10/2003 | Vinegar et al. ............. 324/355 |

FOREIGN PATENT DOCUMENTS

| GB | 2 338 253 | 12/1999 |
| WO | WO 00/41006 | 7/2000 |

* cited by examiner

*Primary Examiner*—Anjan K. Deb
(74) *Attorney, Agent, or Firm*—Jennie Salazar; Brigitte L. Echols

(57) ABSTRACT

The invention relates to a device for measuring an electrical parameter through electrically-conductive casing, said device including a current injection electrode (3) and a measurement electrode (7) on one side of the wall of the casing (1). According to the invention, the injection electrode (3) is associated via a first magnetic coupler (4) with a current source (2) and the measurement electrode (7) is associated via a second magnetic coupler (6) with a measurement device (5) situated on the other side of the wall.

20 Claims, 2 Drawing Sheets

FIG.1
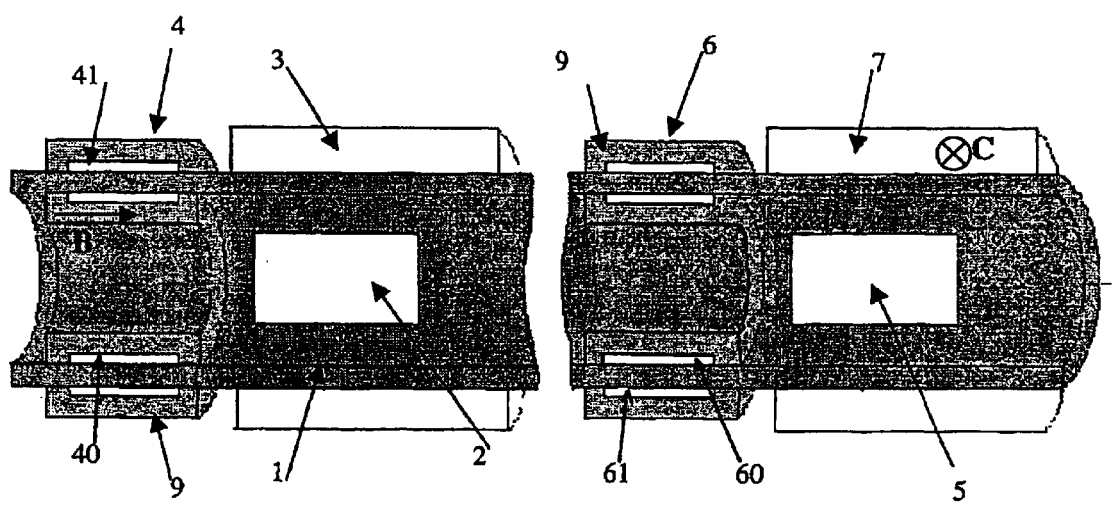
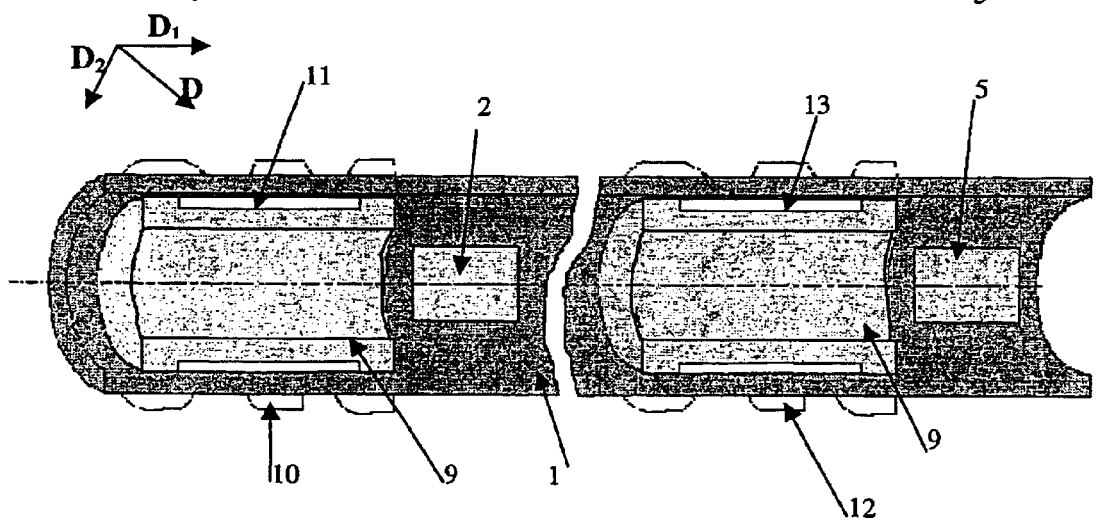
FIG.2

DEVICE FOR MEASURING AN ELECTRICAL PARAMETER THROUGH ELECTRICALLY-CONDUCTIVE CASING

CROSS REFERENCE TO RELATED APPLICATION

The present application is the national stage under 35 U.S.C. 371 of PCT/EP01/10260, filed Sep. 05, 2001.

The invention relates to a device for measuring an electrical parameter through electrically-conductive casing. Preferred applications of the invention concern the field of measuring resistivity in hydrocarbon wells.

Hydrocarbon production must be controlled and monitored regularly or continuously in order to determine the causes of any decrease in or stoppage of production, and in order to remedy them. In addition to the production means implemented, production depends on the characteristics of the deposit. In this respect, important information is constituted by the position in the deposit of the hydrocarbon/water or hydrocarbon/gas contact interface. It is essential not only to detect any water or gas pocket, but also to know the position of such a pocket at all times, in order to prevent the water from reaching the production well.

In known manner, the electrical resistivity of the rocks is used by way of representative characteristic of the deposit. The resistivity of hydrocarbons is generally much higher than the resistivity of formation water, which is charged with salt. In known manner, the measurement is taken by using a logging sonde carrying electrodes in contact with the rock wall, and measuring means making it possible to determine the resistivity of the layers encountered. However, when casing has been cemented to the walls of the well, that type of measurement is no longer possible.

The Applicant's Document FR 93 13720 describes an example of how resistivity measurement can be implemented in a hydrocarbon well whose walls are covered with cemented metal casing. That document proposes disposing at least one measurement electrode permanently in the well so as to guarantee electrical coupling between the electrode and the deposit, and then causing a current to flow in the deposit and measuring the potential difference between the measurement electrode and a reference electrode. In which case, the means for measuring the potential difference are fixed permanently to the outside of the casing and are connected to the surface via a link electrical cable, set in the cement in the annular space between the casing and the walls of the well.

That technique suffers from certain drawbacks. The means for measuring the potential difference are generally constituted by electronics equipment, and they are quite fragile. Putting them permanently down the well, where conditions are corrosive and abrasive, can damage them and they are then particularly complicated to replace. In addition, the cable in the annular space also gives rise to drawbacks by complicating installation of the casing. There is also a risk of the cable breaking and of the layer of cement between the casing the walls of the well being weakened, and therefore of the leaktightness between the geological formations and the inside of the well being reduced.

Patent Application GB 2 338 253 describes a device for measuring resistivity, which device includes measurement electrodes disposed permanently on the casing of the well. That document aims to solve the problems posed by the cable being cemented in the annular space by proposing a measurement device that delivers an electrical signal into the casing without it being necessary to lower a cable extending between the electronic measurement means and the surface of the well. Those electronic measurement means are installed inside the casing so as to avoid damaging them, and orifices make it possible to connect them to the outer conductive coating. That solution suffers from drawbacks. The orifices drilled through the casing reduce its strength, while the stresses to which it is subjected are relatively high, in particular due to the downhole pressure. In addition, the casing can be damaged by the fluids from the formation, which poses leaktightness problems and can give rise to damage to the electronic means. Finally, the need to provide orifices in the casing, and then to lay out the network of wires between the electronic means and the outer conductive coating makes that solution particularly complicated.

An object of the invention is to remedy those drawbacks by providing a device for measuring an electrical parameter through electrically-conductive casing, which device makes it possible to preserve the structural integrity not only of the electronic measurement means but also of the wall of the casing.

The invention thus provides a device for measuring an electrical parameter through electrically-conductive casing, said device including a current injection electrode and a measurement electrode on one side of the wall of the casing. According to the invention, the injection electrode is associated via a first magnetic coupler with a current source situated on the other side of the wall of the casing, and the measurement electrode is associated via a second magnetic coupler with a measurement device situated on the other side of the wall.

The use of magnetic couplers makes it possible to avoid drilling through the wall to pass wires for connecting the current source to the injection electrode, and for connecting the measurement means to the measurement electrode. In this way, the device of the invention does not reduce the strength of the casing. In addition, the device offers the advantage of being particularly simple because the number of connection wires is significantly reduced.

In an embodiment of the invention, the current injection electrode is a toroidal coil wound around a magnetic core, said coil surrounding the wall of the casing.

The use of toroidal coils offers the advantage of being very simple and inexpensive. In addition, when the casing is cemented to the walls of a hydrocarbon well, the ease with which the coils can be put in place on the casing does not hinder the cementing operations. Since the coils are also strong, leaving them in place in an aggressive environment such as a well poses no problem.

In an embodiment of the invention, the magnetic couplers are inductive couplings between a primary solenoid winding and a secondary solenoid winding, said windings being situated on either side of the wall of the casing.

Since the windings avoid having to drill through the wall, the device of the invention may even be used when it is essential to guarantee leaktightness relative to the outside environment: e.g. when the casing has been cemented to the walls of a hydrocarbon well. In which case, it is possible to take measurements without any fear of the casing deteriorating prematurely.

In an advantageous embodiment of the invention, the primary winding of the first magnetic coupler is electrically connected to the current source, said primary winding being situated on the outside face of electrically-conductive tubing, said tubing being mounted to move coaxially inside the casing.

This embodiment is particularly advantageous when the casing has been cemented to the walls of a well. In which case, the tubing is lowered only when the device of the invention is to be used, the more fragile elements, namely the current source and the measurement means (when the same applies to the primary winding of the second magnetic coupler), not being present permanently in the well. In addition, these more fragile elements remain easily accessible, so there is no problem in replacing them and verifying them.

The invention also provides a device for measuring an electrical parameter through electrically-conductive casing, said device including, on one side of the wall of the casing, measurement means for measuring an electrical parameter and a current source for causing a current to pass in said casing. According to the invention, the current source is associated via a first solenoid winding with an injection magnetic circuit situated on the other side of the wall of the casing, and the measurement means are associated via a second solenoid winding with a measurement spirally-wound magnetic circuit situated on the other side of the wall.

This embodiment makes it possible to simplify the device of the invention. It makes it possible to bring together the injection electrode and the secondary winding of the first magnetic coupler into a single injection magnetic circuit. In addition, it makes it possible to bring together the measurement electrode and the secondary winding of the second magnetic coupler into a single measurement magnetic circuit. The two magnetic fields generated by the first magnetic coupler and by the injection electrode are thus replaced with a single injection spirally-wound magnetic field having two components: namely, one component along the axis of the tubing and corresponding to the field generated by the coupler, and another component which is tangential and which corresponds to the field generated by the injection electrode around the casing. The same applies to the second magnetic coupler and the measurement electrode. In addition, this solution makes it possible to omit the connection means between the electrodes and the secondary windings of the magnetic couplers. It is thus particularly simple.

In an embodiment, the first solenoid winding is electrically connected to the current source, said first winding being situated on the outside face of electrically-conductive tubing, said tubing being mounted to move coaxially inside the casing.

This embodiment makes it possible to use a simple device of the invention when the casing has been cemented to the walls of the well, while preserving the more fragile elements of the device, since they are not permanently downhole: the tubing is lowered only when it is used to take the measurements.

Finally, the invention provides a method of measuring the resistivity of a geological formation surrounding a hydrocarbon well lined with an electrically-conductive casing, in which method:

two injection spirally-wound magnetic circuits and two measurement spirally-wound magnetic circuits are fixed to the outside face of the casing so that they are uniformly spaced apart, with said measurement spirally-wound magnetic circuits being situated between said injection spirally-wound magnetic circuits;

two first solenoid windings and two second solenoid windings are fixed to the outside face of electrically-conductive tubing that is smaller in diameter than the casing, so that the spacing between said windings is identical to the spacing between the measurement spirally-wound magnetic circuits and the injection spirally-wound magnetic circuits, and so that the second solenoid windings are situated between the first solenoid windings;

each of the first solenoid windings is connected to a current source;

each of the second solenoid windings is connected to measurement means;

the tubing is lowered into the cased well until the first solenoid windings come into register with the injection magnetic circuits, so that an electric current flows in the casing, the second solenoid windings being in register with the measurement magnetic circuits; and the resistivity of the formation surrounding the casing between the two measurement magnetic circuits is determined on the basis of the difference between the electrical parameters read by the measurement means.

This method makes it possible to cause a current to flow in the casing, the distance between the injection spirally-wound magnetic circuits guaranteeing that current is lost to the formation through which the well passes. When the measurement means are constituted by an ammeter circuit, it is thus possible, very simply, to determine the quantity of current coming from the formation that enters the casing between the two measurement spirally-wound circuits. Since this quantity is inversely proportional to the resistivity of the formation, the conductive fluid content of the formation can be deduced from it.

Other advantages and characteristics of the invention appear more clearly from the following description given with reference to the accompanying drawings, in which:

FIG. 1 shows an embodiment of a measurement device of the invention;

FIG. 2 shows another embodiment of a device of the invention;

Figure 3:
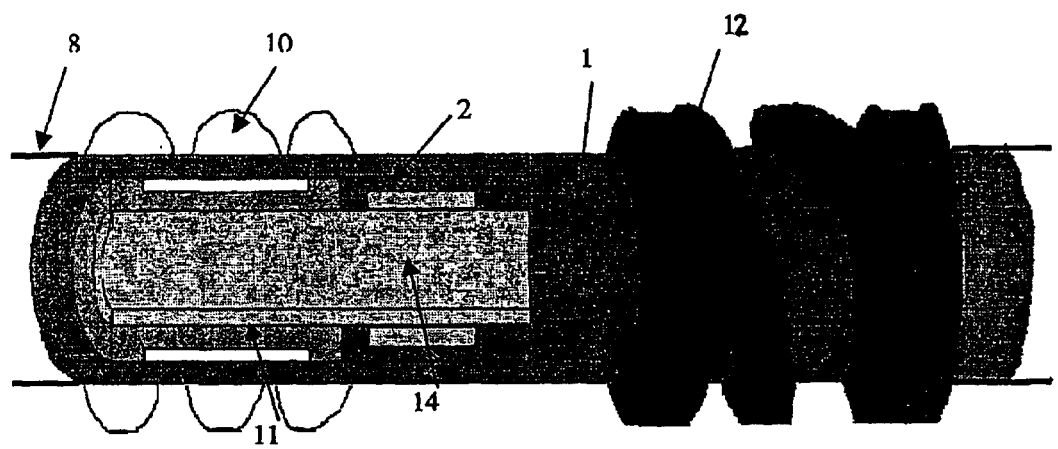
FIG. 3 shows an example of a device of the invention in use.

FIG. 1 shows an embodiment of a measurement device of the invention. A current source 2 and measurement means 5 are disposed inside casing 1 that is electrically conductive and, for example, made of metal. The current source 2 is connected via a first magnetic coupler 4 to an injection electrode 3 situated outside the casing 1. Similarly, the measurement means 5 are connected via a second magnetic coupler 6 to a measurement electrode 7 situated outside the casing 1.

In the embodiment shown, the injection electrode and the measurement electrode are formed in the same manner (it is possible, however, to consider forming them in different manners). Each of the electrodes is made up of a toroidal coil wound around a magnetic core (not shown), said coil surrounding the casing 1. In the same embodiment, the first magnetic coupler 4 is formed in the same way as the second magnetic coupler 6. Such couplers are known from the state of the art. They are made up of respective primary and secondary solenoids 40 & 41 and 60 & 61, situated on either side of the wall of the metal casing 1. Each of the solenoids may be inserted in a magnetic material 9, thereby improving the effectiveness of the magnetic couplers. Advantageously, the solenoids are annular in shape.

Inside the casing 1, electrical wires (not shown for reasons of clarity) connect the primary solenoid 40 to the current source 2, and connect the primary solenoid 60 to the measurement means 5. Similarly, outside the casing, the secondary solenoid 41 is connected to the injection electrode 3, and the secondary solenoid 61 is connected to the measurement electrode 7. In this way, the current source 2 and the measurement means 5 are respectively connected to the injection electrode 3 and to the measurement electrode 7 without it being necessary to drill through the casing 1. The primary and secondary solenoids of the magnetic couplers 4 and 6 are coupled together via a magnetic field B situated in a plane containing the axis of the casing 1.

In one embodiment, the current source 2 is an AC voltage generator and the measurement means 5 are constituted by an ammeter circuit. In which case, the injection electrode 3, around the casing 1, is a voltage transformer. The voltage generator 2, delivering a voltage $V_{gen}$, induces a voltage $V_{case}$ in the metal casing 1 (which is thus the secondary winding of the transformer) via the first magnetic coupler 4. This voltage is such that: $V_{case}=V_{gen}/N.R$ where N is number of turns of the toroidal coil that is the injection electrode 3, and R is the transformation ratio between the two solenoids 40 and 41 (i.e. the ratio between the numbers of turns of the solenoids). A magnetic field C is thus generated in said injection electrode, which field is directed tangentially to the casing 1.

Since the measurement means 5 are constituted by an ammeter circuit, the measurement electrode operates as a current transformer. The electrical parameter read by the ammeter circuit is a current $I_{read}$ which is a function of the current $I_{eff}$ effectively flowing in the casing 1. This current is given by the relationship: $I_{read}=I_{eff}/n.r$ where n represents the number of turns of the toroidal coil that is the measurement electrode 7, and r is the transformation ratio between the two solenoids 60 and 61. A magnetic field C is also generated that is directed tangentially to the casing 1.

In this way, the measurement device of the invention makes it possible, without damaging the wall of the casing 1, to cause a current to flow in said casing by means of the injection electrode, and then to measure the value of the current effectively flowing by means of the measurement electrode.

The device shown in FIG. 1 may be simplified as shown by a preferred embodiment given in FIG. 2. In the device shown in FIG. 1, for each coupling firstly between the current source and the injection electrode, and secondly between the measurement means and the measurement electrode, there are two magnetic fields that are distinct and substantially close together. The magnetic field B generated in the magnetic couplers 4 and 6 is close and perpendicular to the magnetic field C induced in the injection electrode 3 and in the measurement electrode 7. The presence of these two magnetic fields complicates making the measurement device and reduces its quality in terms of efficiency and reliability.

This problem has been solved by a solution that is equivalent in function to the solution described with reference to FIG. 1, but that is much simpler to make. In the embodiment shown in FIG. 2, the magnetic materials 9 surrounding the secondary solenoids 41 and 61 and the magnetic cores of the electrodes 3 and 7 have been brought together in a single piece. Said secondary solenoids and the toroidal coils of said electrodes can thus be omitted.

Thus, as shown in FIG. 2, an injection spirally-wound magnetic circuit 10 is obtained outside the casing 1, and it is connected to the current source 2 via a first solenoid winding 11. Similarly, a measurement spirally-wound magnetic circuit 12 is obtained that is connected to the measurement means 5 via a second solenoid winding 13. The solenoid windings 11 and 13 are inserted in a magnetic material 9.

In the embodiment shown, the injection spirally-wound magnetic circuit 10 and the measurement spirally-wound magnetic circuit 12 are identical, and each of them is made up of a fine foil of metal having high magnetic permeability and whose thickness is about one millimeter (the higher the magnetic permeability of the metal, the finer the foil can be). The foil is spirally wound around the outside face of the casing 1. As a result, a spirally-wound magnetic circuit is created in which a magnetic field D flows. This field has two components: a component $D_1$ along the axis of the casing 1, and a tangential component $D_2$. In association with the current source 2, the component $D_1$ provides the coupling with the first solenoid winding 11, while the component $D_2$ provides the function of the injection electrode 3. In association with the measurement means 5, the component $D_1$ provides coupling with the second solenoid winding 13, and the component $D_2$ serves as the measurement electrode 7. The first and second solenoid windings 11 and 13 extend over the entire length of the spirally-wound magnetic circuits 10 and 12.

In the same way as described above, the injection spirally-wound magnetic circuit 10 surrounding the casing 1 is a voltage transformer inducing a voltage $V_{case}$ in said casing. The measurement spirally-wound magnetic circuit 12 surrounding the casing 1 operates as a current transformer to measure the current $I_{eff}$ effectively flowing in said casing, when the measurement means are constituted by an ammeter circuit.

This embodiment is thus particularly simple because a single magnetic field D provides coupling between the current source or the measurement means and the injection or measurement magnetic circuits through the wall of the casing 1. In addition, it is no longer necessary to provide electrical wires for connecting the secondary windings 41 or 61 to the injection electrode 3 or to the measurement electrode 5 as in the preceding above-described solution. However, in functional terms, both solutions are similar.

FIG. 3 is a view partially in section of an example of a measurement device of the invention in use. In this embodiment, the casing 1 has been cemented to the walls of a well 8 bored through a terrestrial formation, e.g. a hydrocarbon, gas, or water well. The casing 1 is thus non-removable, and the elements that were situated on its outside face (e.g. the spirally-wound magnetic circuits) have been cemented to the walls of the well. In this use, tubing 14 that is electrically conductive carries the elements that were situated inside the casing 1 in the embodiments shown in FIGS. 1 and 2. This tubing has an outside diameter smaller than the inside diameter of the casing 1. In this way, the tubing 14 is mounted to move inside the casing 1, and, as a function of needs, it can be raised or lowered in the well.

Firstly the current source 2 and the first solenoid winding 11, and secondly the measurement means 5 and the second solenoid winding 13 (not shown in FIG. 3) are thus situated on the outside face of the tubing 14. The spacing between the first solenoid winding and the second solenoid winding is substantially identical to the spacing between the two injection and measurement spirally-wound magnetic circuits cemented to the outside face of the casing 1. In another embodiment, the current source and the measurement means are situated at the surface, and cables connect them to the solenoid windings.

The current source 2, the measurement means, and the solenoid windings are fixed to the tubing 14 outside the well, which is particularly convenient because the elements are then easily accessible. Another advantage is that the tubing 14 can be lowered into the well only when the device of the invention is to be used: the fragile portions thus do not remain permanently in the well, which makes it possible to preserve them. In this example of use, the solution using spirally-wound magnetic circuits is particularly attractive. This equipment cemented with the casing is very simple and robust, and can thus withstand being present permanently downhole.

Once the current source and the measurement means and, respectively, the first solenoid winding 11 and the second solenoid winding 13 have been installed on and connected to the tubing 14, the tubing is lowered into the well so that the first solenoid winding 11 is situated in the annular space between the outside face of the tubing and the inside face of the casing 1 and comes substantially into register with the injection spirally-wound magnetic circuit 10 situated on the outside face of the casing 1 and cemented to the walls of the well.

In this way, a current flows in the casing 1. In addition, since the second solenoid winding 13 is in register with the measurement spirally-wound magnetic circuit 12, the measurement means are connected to said circuit, and it is possible to read off the value of the desired electrical parameter.

Figure 4:
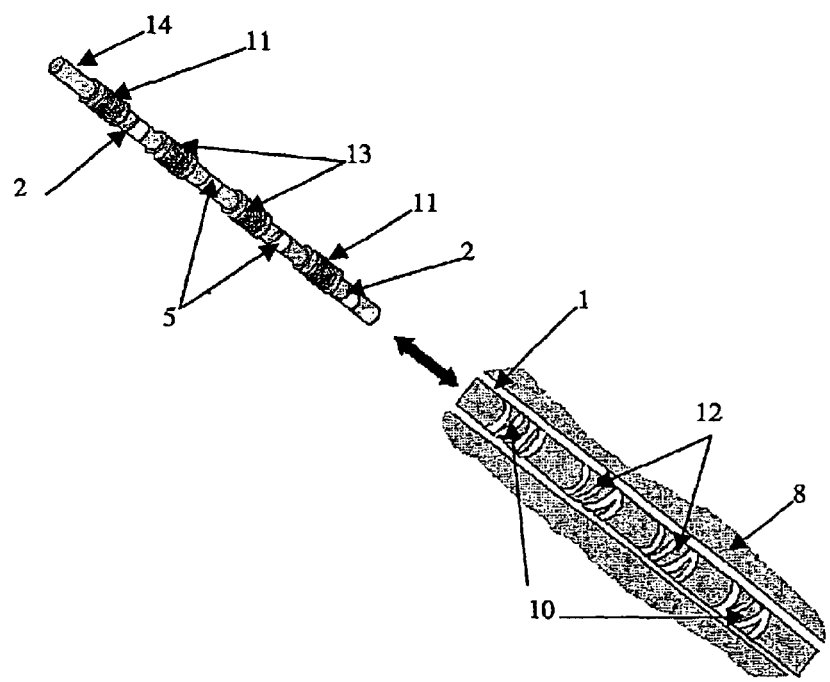
FIG. 4 shows a particular example of use, comprising a plurality of devices of the invention.

FIG. 4 shows an advantageous example of use of two measurement devices of the invention for measuring resistivity, e.g. the resistivity of the geological formations surrounding a hydrocarbon well. The casing 1 has been cemented to the walls of the well with, on its outside face, two injection spirally-wound magnetic circuits and two measurement spirally-wound magnetic circuits, these circuits being uniformly spaced apart along the casing. Both of the measurement magnetic circuits are situated between the injection magnetic circuits.

Tubing 14 carries the other elements that make up the two measurement devices, namely the first solenoid windings 11 connected to two current sources 2 and two second solenoid windings 13 connected to measurement means 5. In this embodiment, the measurement means are ammeter circuits. The two second solenoid windings are situated between the two first solenoid windings. The spacing between a first solenoid winding and a second solenoid winding is identical to the spacing between an injection magnetic circuit and a measurement magnetic circuit. In this way, when the tubing 14 is lowered into the well, the first solenoid windings come into register with the injection magnetic circuits, and the second solenoid windings come into register with the measurement magnetic circuits.

The injection spirally-wound magnetic circuits 10 induce a current in the casing 1. The spacing between these two circuits causes current to be lost to the formation that surrounds the well. The difference between the two current measurements read by the ammeter circuits then makes it possible to determine the quantity of current coming from the formations, which quantity enters the casing between the two measurement spirally-wound magnetic circuits. Since this quantity is inversely proportional to the resistivity of the formations, an approximation of their nature is deduced from it.

The example shown in FIG. 4 is naturally merely a non-limiting example of the possible uses of the measurement device of the invention. It is possible to use a higher number of measurement devices, along the entire length of the casing and of the tubing. In addition, there are numerous uses for this device in the petroleum sector, in particular for any resistivity measurements. It is thus possible to consider a use on the same principle as the principle shown in FIG. 4, for measuring the resistivity of an effluent flowing along a pipe. In which case, the injection and measurement spirally-wound magnetic circuits (or injection and measurement electrodes and magnetic couplers) are positioned on the inside face of the casing, and the first and second solenoid windings, the current sources, and the measurement means are fixed to the outside face. Current thus flows in the casing with current being lost into the effluent. The current measured between the two measurement spirally-wound magnetic circuits is representative of the resistivity of said effluent and particularly of its salt water content, salt water being more highly conductive than hydrocarbons.

The device of the invention may also be used on any casing that is electrically conductive. If at least one measurement spirally-wound magnetic circuit is disposed on one side of the wall of the casing, and first and second solenoid windings are disposed on the other side of said wall, it is possible to implement the device of the invention in any use for measuring an electrical parameter. A user may regularly take measurements in the casing by having available at least one current source and measurement means, and by connecting them to the solenoid windings when taking the measurements.

What is claimed is:

1. A device for measuring an electrical parameter through electrically-conductive casing, said device including a current injection electrode and a measurement electrode on one side of the wall of the casing, said device being characterized in that:

the injection electrode is associated via a first magnetic coupler with a current source situated on the other side of the wall of the casing; and the measurement electrode is associated via a second magnetic coupler with a measurement device situated on the other side of the wall; and said current injection electrode and said measurement electrode are associated with said current source and said measurement device via said first magnetic coupler, second magnetic coupler and wall of the casing.

2. A device according to claim 1, characterized in that the current injection electrode is a toroidal coil wound around a magnetic core, said coil surrounding the wall of the casing.

3. A device according to claim 1, characterized in that the measurement electrode is a toroidal coil wound around a magnetic core, said coil surrounding the wall of the casing.

4. A device according to claim 1, characterized in that the magnetic couplers are inductive couplings between a primary solenoid winding and a secondary solenoid winding, said windings being situated on either side of the wall of the casing.

5. A device according to claim 4, characterized in that the primary solenoid winding and the secondary solenoid winding is inserted in a magnetic material.

6. A device according to claim 4, characterized in that the secondary winding of the first magnetic coupler and the injection electrode are electrically interconnected and are situated on the outside face of the casing.

7. A device according to claim 6, characterized in that the primary winding of the first magnetic coupler is electrically connected to the current source, said primary winding being situated on the outside face of electrically-conductive tubing, said tubing being mounted to move coaxially inside the casing.

8. A device according to claim 4, characterized in that the secondary winding of the second magnetic coupler and the measurement electrode are electrically interconnected and are situated on the outside face of the casing.

9. A device according claim 8, characterized in that the primary winding of the second magnetic coupler is electrically connected to the measurement means, said primary winding being situated on the outside face of electrically-conductive tubing, said tubing being mounted to move coaxially inside the casing.

10. A device according to claim 4, characterized in that the primary winding of the first magnetic coupler is electrically connected to the current source, said primary winding being situated on the outside face of electrically-conductive tubing, said tubing being mounted to move coaxially inside the casing.

11. A device according claim 4, characterized in that the primary winding of the second magnetic coupler is electrically connected to the measurement means, said primary winding being situated on the outside face of electrically-conductive tubing, said tubing being mounted to move coaxially inside the casing.

12. A device according to claim 1, characterized in that the measurement means comprise an ammeter circuit serving to measure the current flowing in the casing.

13. A device for measuring an electrical parameter through electrically-conductive casing, said device including, on one side of the wall of the casing, measurement means for measuring an electrical parameter and a current source for causing a current to pass in said casing, said device being characterized in that the current source is associated via a first solenoid winding with an injection spirally-wound magnetic circuit situated on the other side of the wall of the casing, and in that the measurement mean are associated via a second solenoid winding with a measurement spirally-wound magnetic circuit situated on the other side of the wall.

14. A device according to claim 13, characterized in that the injection spirally-wound magnetic circuit is constituted by a metal foil spirally wound around the outside face of the casing.

15. A device according to claim 13, characterized in that the measurement spirally-wound magnetic circuit comprises a magnetic metal foil spirally wound around the outside face of the casing.

16. A device according to claim 13, characterized in that the first solenoid winding is electrically connected to the current source, said first winding being situated on the outside face of electrically-conductive tubing, said tubing being mounted to move coaxially inside the casing.

17. A device according to claim 16, characterized in that the second solenoid winding is electrically connected to the measurement means, said second winding being situated on the outside face of electrically-conductive tubing, said tubing being mounted to move coaxially inside the casing.

18. A device according to claim 13, characterized in that the second solenoid winding is electrically connected to the measurement means, said second winding being situated on the outside face of electrically-conductive tubing, said tubing being mounted to move coaxially inside the casing.

19. A device according to claim 13, characterized in that the measurement means comprise an ammeter circuit serving to measure the current flowing in the casing.

20. A method of measuring the resistivity of a geological formation surrounding a hydrocarbon well lined with an electrically-conductive casing, said method being characterized in that:

two injection spirally-wound magnetic circuits and two measurement spirally-wound magnetic circuits are fixed to the outside face of the casing so that they are uniformly spaced apart, with said measurement magnetic circuits being situated between said injection magnetic circuits;

two first solenoid windings and two second solenoid windings are fixed to the outside face of electrically-conductive tubing that is smaller in diameter than the casing, so that the spacing between said windings is identical to the spacing between the measurement spirally-wound magnetic circuits and the injection spirally-wound magnetic circuits, and so that the second solenoid windings are situated between the first solenoid windings;

each of the first solenoid windings is connected to a current source;

each of the second solenoid windings is connected to measurement means;

the tubing is lowered into the cased well until the first solenoid windings come into register with the injection magnetic circuits, so that an electric current flows in the casing, the second solenoid windings being in register with the measurement magnetic circuits;

said injection spirally-wound magnetic circuits and said measurement spirally-wound circuits are associated with said current source and said measurement means via said first solenoid windings, second solenoid windings and wall of the casing; and the resistivity of the formation surrounding the casing between the two measurement magnetic circuits is determined on the basis of the difference between the electrical parameters read by the measurement means.

* * * * *